United States Patent [19]

Moriya et al.

[11] 4,438,465
[45] Mar. 20, 1984

[54] TRACKING CONTROL SYSTEM FOR AN INFORMATION SIGNAL RECORDING AND REPRODUCING APPARATUS

[75] Inventors: Ryusuke Moriya, Hadano; Takeo Eguchi, Hadani; Takeo Ohba, Sagamihara, all of Japan

[73] Assignee: Sony Corporation, Tokyo, Japan

[21] Appl. No.: 330,255

[22] Filed: Dec. 14, 1981

Related U.S. Application Data

[63] Continuation-in-part of Ser. No. 261,455, May 7, 1981.

[30] Foreign Application Priority Data

Dec. 13, 1980 [JP] Japan ................. 55-176411

[51] Int. Cl.³ ............................................. G11B 5/02
[52] U.S. Cl. .................................................. 360/22
[58] Field of Search ........................ 360/37.1, 22, 21

[56] References Cited

U.S. PATENT DOCUMENTS 4,214,259 7/1980 Chang ............................ 360/22
4,321,634 3/1982 Lebureau ......................... 360/22

*Primary Examiner*—Vincent P. Canney

*Attorney, Agent, or Firm*—Lewis H. Eslinger; Alvin Sinderbrand

[57] ABSTRACT

Apparatus for simultaneously reproducing information signals that have simultaneously been recorded in four successive, parallel channel tracks on a record medium, with a first pair of first and second ones of the four channel tracks being adjacent to each other and having the information signals recorded therein with different azimuth angles and with the information signals recorded in one of the first or second channel track being delayed relative to the information signals recorded in the other of the first and second channel tracks, and with a second pair of the remaining third and fourth ones of the four channel tracks being adjacent to each other and having the information signals recorded therein with different azimuth angles; said apparatus including four magnetic heads movable in a direction along the four channel tracks for reproducing the signals recorded therein; and a tracking control circuit for controlling the relative positions of the four magnetic heads and the record medium so that the four magnetic heads accurately scan respective ones of the four channel tracks in response to the phase difference between the signals recorded in the first pair of channel tracks or the phase difference between the signals recorded in the second pair of channel tracks.

10 Claims, 36 Drawing Figures

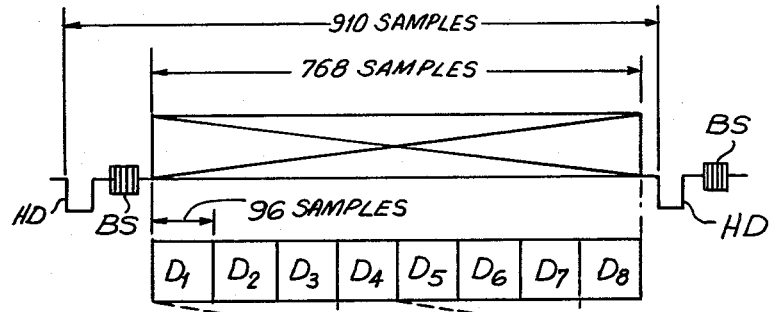
FIG.6A
FIG.6B (AB CHANNEL)
FIG.6C (CD CHANNEL)
FIG.6D (A CHANNEL)
FIG.6E (B CHANNEL)
FIG.6F (C CHANNEL)
FIG.6G (D CHANNEL)
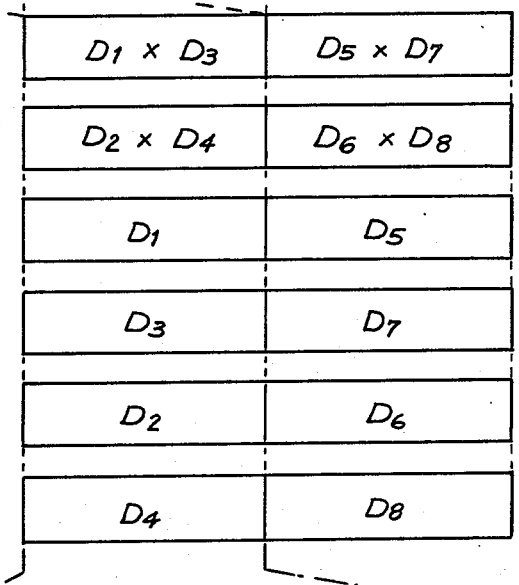
FIG.6H
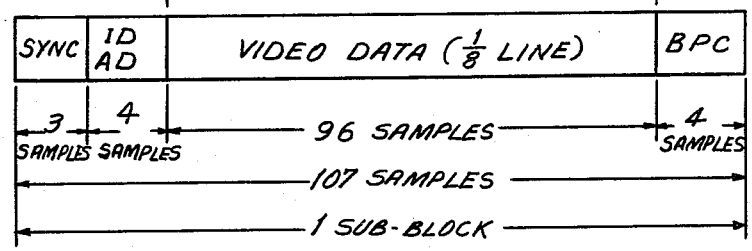

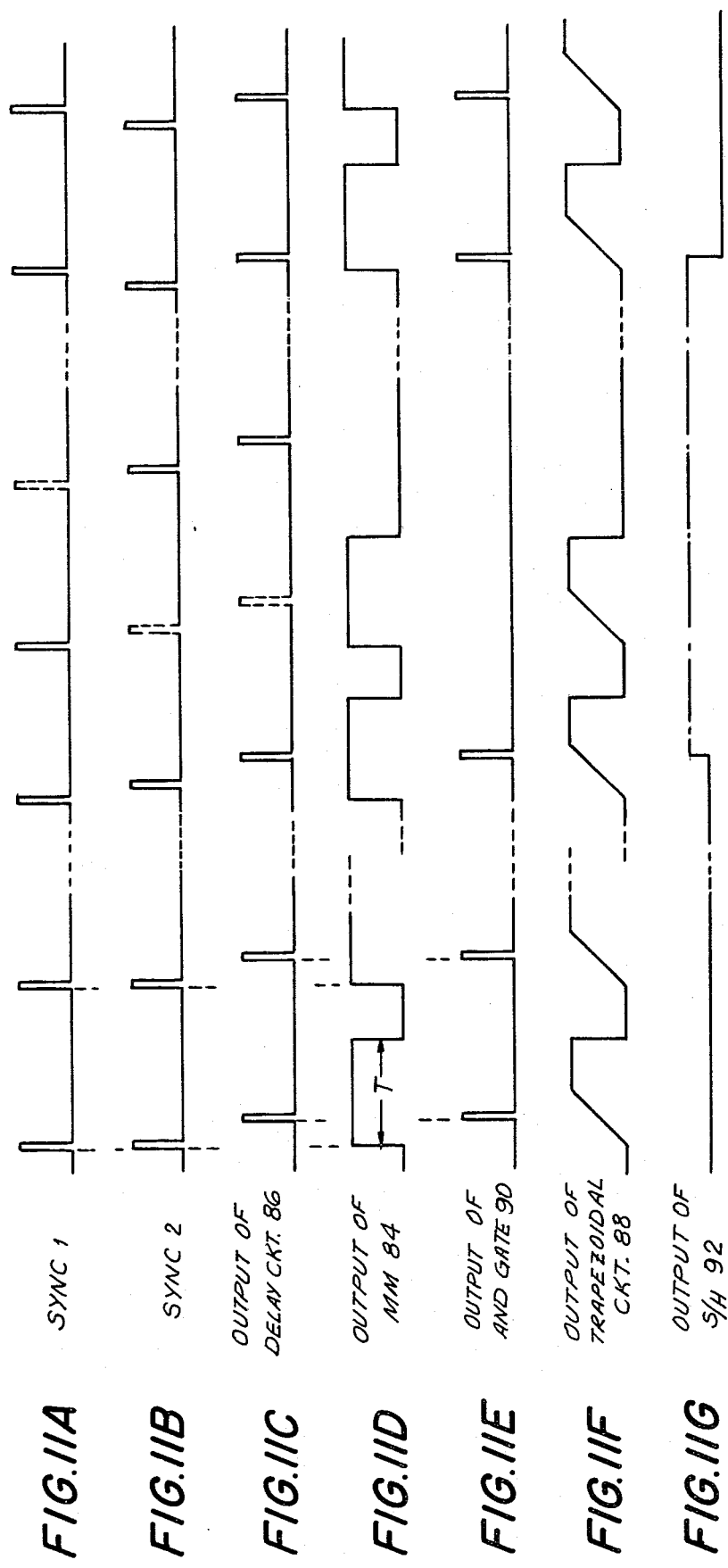

FIG.15
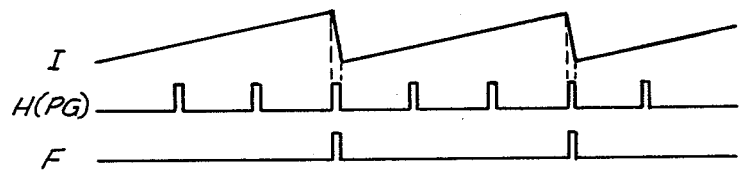

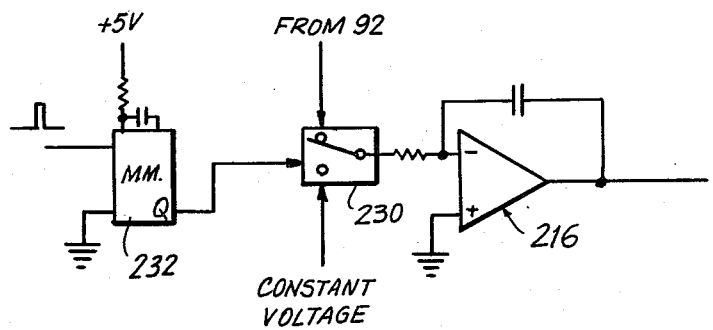
FIG.17

TRACKING CONTROL SYSTEM FOR AN INFORMATION SIGNAL RECORDING AND REPRODUCING APPARATUS

REFERENCE TO RELATED APPLICATION

This application is a continuation-in-part application of U.S. patent application Ser. No. 06/261,455, filed May 7, 1981, entitled TRACKING CONTROL SYSTEM FOR MAGNETIC RECORDING AND REPRODUCING SYSTEM.

BACKGROUND OF THE INVENTION

1. Field of the Invention

This invention relates generally to information recording and reproducing apparatus and, more particularly, is directed to a tracking control system for an information recording and reproducing apparatus.

2. Description of the Prior Art

Generally, in an information signal recording and reproducing apparatus, such as a video tape recorder (VTR), the quality of the reproduced signal deteriorates if there is a deviation or tracking error between the position of a recorded track on a magnetic recording medium and the position of a reproducing magnetic head as the latter traces the recording medium during the reproduction operation. In order to eliminate this tracking error, it is necessary to effect a tracking control operation. For example, in a VTR where the video signal is recorded and reproduced by means of a rotary magnetic head assembly, the aforementioned tracking control operation can be performed by a capstan servo-control operation with respect to a capstan motor, the latter of which controls the speed of advancement of the magnetic recording medium in accordance with the tracking error. Another example of a tracking control system that has been used with conventional VTRs is described in U.S. Pat. No. 4,151,570 to Ravizza. In this patent, a wobbling or dithering signal is used to provide a slight vibration to the reproducing magnetic head, whereby the position of the reproducing magnetic head is controlled such that the envelope of the reproduced signal therefrom is at a maximum. However, with the capstan servo-control system, above-described, accurate reproduction of a track from the beginning to the end thereof may not be possible, as discussed more fully in copending U.S. patent application Ser. No. 06/261,445, filed May 7, 1981, having a common assignee herewith, and the disclosure of which is incorporated herein by reference. It is to be appreciated that, since accurate tracking cannot be obtained for the entire length of a track using the aforementioned capstan servo-control system, this system has serious drawbacks, especially when used with respect to narrow recording tracks. With the tracking control operation effected by use of a wobbling or dithering signal, although an increased response speed is obtained over the capstan servo-control system, the effective level of the envelope of the reproduced signal is reduced to about 90% by such wobbling, whereby deterioration of the overall signal-to-noise (S/N) ratio inevitably results.

Accordingly, it has been proposed in the aforementioned U.S. patent application Ser. No. 06/261,445, to digitize the video signal and then separate the digitized video signal into two separate channels prior to recording the signal on a magnetic tape. A magnetic head is associated with each channel and the two magnetic heads are aligned to record the respective channels on a magnetic tape in parallel tracks extending obliquely on the tape while also providing the two magnetic heads with different azimuth angles. During a reproduction operation, a tracking control operation is effected by obtaining a tracking error in accordance with the phase difference between the reproduced signals from the individual channels. In this manner, steady and accurate tracking control is obtained without deterioration of the S/N ratio and with a high response speed.

It is to be appreciated that the recording of a digitized color video signal in two channels requires the use of a high bit rate for the recording signal, whereby a large quantity of magnetic tape is used. To overcome this deficiency, it has been proposed to further distribute the recording signal to at least four channels by use of a corresponding number of magnetic heads, thereby reducing the bit rate of the recording signal. In such case, four rotary magnetic heads are used to record the signal in four parallel and adjacent channel tracks for each field of information, with the first and third alternate tracks having the same first azimuth angle and the second and fourth alternate tracks having a second azimuth angle equal and opposite to the first azimuth angle. Since the phase difference between the signals in the first and second tracks or the phase difference between the signals in the third and fourth tracks can be used to effect a tracking control operation, two stable operating positions for the rotary heads exist. In particular, a first stable operating position exists when the first through fourth heads scan the first through fourth tracks in a correct and desired manner. The second operating position occurs, when the first, second, third and fourth heads scan the third, fourth, first and second tracks, respectively. This latter operating position causes a phase shift in the reproduced signals which of course, is undesirable. It is therefore desirable that the tracking control system operate in a stable manner only when the heads scan the tracks in the aforementioned first operating position.

OBJECTS AND SUMMARY OF THE INVENTION

Accordingly, it is an object of this invention to provide a tracking control system that avoids the above-described difficulties encountered in the prior art.

More particularly, it is an object of this invention to provide a tracking control system for a four channel recording system that operates in a stable mode only when the four magnetic heads correctly scan the respective recorded tracks.

In accordance with an aspect of this invention, apparatus for simultaneously recording information signals in at least four successive, parallel channel tracks on a record medium, includes processing means for processing the information signals and for distributing the information signals into at least four channels; at least four transducer means corresponding to the at least four channels for recording the information signals from the at least four channels in the at least four channel tracks on the record medium, with first and second adjacent ones of the at least four channel tracks having the information signals recorded therein with different azimuth angles; and delay means for delaying the information signals recorded in one of the first and second channel tracks relative to the information signals recorded in the other of the first and second channel tracks.

In accordance with another aspect of this invention, apparatus is provided for simultaneously reproducing information signals that have simultaneously been recorded in four successive, parallel channel tracks on a record medium, with first and second ones of the four channel tracks being adjacent to each other and having the information signals recorded therein with different azimuth angles and with the information signals recorded in one of the first and second channel tracks being delayed relative to the information signals recorded in the other of the first and second channel tracks, and with the remaining third and fourth ones of the four channel tracks being adjacent to each other and having the information signals recorded therein with different azimuth angles; said apparatus including four transducer means movable in a direction along the four channel tracks for reproducing the signals recorded therein; and tracking control means for controlling the relative positions of the four transducer means and the record medium so that the four transducer means accurately scan respective ones of the four channel tracks in response to the phase difference between the signals recorded in the first pair of channel tracks or the phase difference between the signals recorded in the second pair of channel tracks.

The above, and other, objects, features and advantages of the invention, will be apparent in the following detailed description of illustrative embodiments thereof which is to be read in connection with the accompanying drawings.

BRIEF DESCRIPTION OF THE DRAWINGS

FIGS. 6A through 7 are schematic diagrams to which reference will be made in explaining the digitization and code arrangement of a video signal for use in a digital VTR embodying this invention;

FIGS. 11A through 11G are waveform diagrams used for illustrating the operation of the tracking control circuit of FIG. 10;

FIGS. 15 and 16 are waveform diagrams used for illustrating the operation of the tracking control circuit of FIG. 14; and FIG. 17 is a block, circuit-wiring diagram of a portion of the tracking control circuit of FIG. 14.

DETAILED DESCRIPTION OF THE PREFERRED EMBODIMENTS

Figure 1:
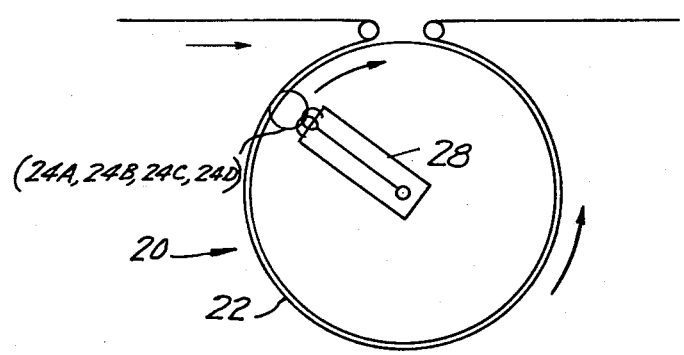
FIG. 1 is a schematic plan view of a rotary magnetic head assembly that can be employed in a recording and/or reproducing apparatus according to this invention.
Figure 2:
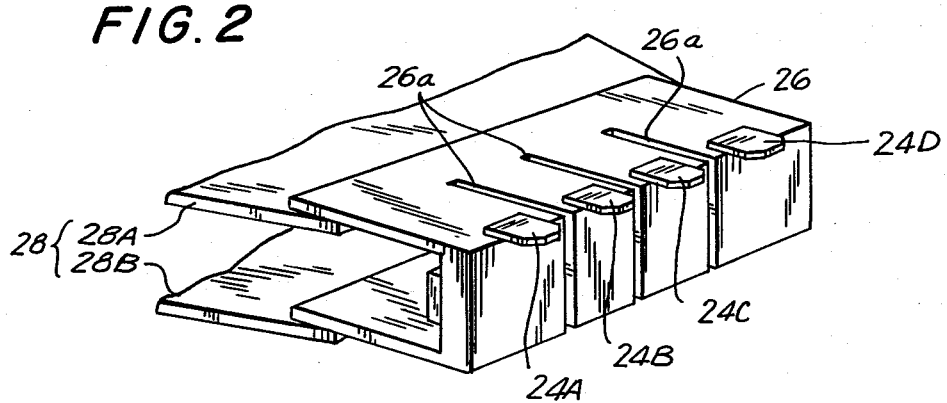
FIG. 2 is a perspective view of the magnetic heads used in the rotary magnetic head assembly of FIG. 1.
Figure 3:
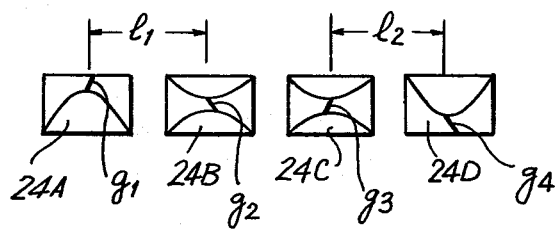
FIG. 3 is a schematic diagram illustrating the different head gaps of the different heads of FIG. 2.

Referring to the drawings in detail, and initially to FIG. 1 thereof, a rotary magnetic head assembly 20 is provided for recording and reproducing a digital video signal in parallel tracks extending obliquely on a magnetic tape 22. Since the transmitting bit rate of the digital video signal is high, four rotary magnetic heads 24A, 24B, 24C and 24D are disposed in close proximity to each other. In particular, the four magnetic heads are positioned in a row on one side of a mounting block 26 having a U-shaped or channel-shaped configuration and which is provided with slits 26a formed between adjacent ones of the magnetic heads for permitting height adjustment of such magnetic heads, as shown in FIG. 2. The individual magnetic heads 24A, 24B, 24C and 24D have respective magnetic head gaps $g_1$, $g_2$, $g_3$ and $g_4$ such that adjacent gaps have different azimuth angles, as shown in FIG. 3. It is to be appreciated, however, that the magnetic head gaps $g_1$ and $g_3$ of first and third magnetic heads 24A and 24C have the same azimuth angle, and the magnetic head gaps $g_2$ and $g_4$ of second and fourth magnetic heads 24B and 24D have the same azimuth angle. However, the magnetic head gaps $g_1$ and $g_2$ of adjacent magnetic heads 24A and 24B have different azimuth angles, and the magnetic head gaps $g_3$ and $g_4$ of adjacent magnetic heads 24C and 24D also have different azimuth angles.

The legs of mounting block 26 are supported at one end of a head support device 28, which consists of two parallel bi-morph plates 28A and 28B mounted on a support base at the opposite end thereof. In this manner, rotary magnetic heads 24A, 24B, 24C and 24D are rotated by head support device 28 and a drive motor (not shown) connected to a rear portion thereof at a constant speed in accordance with the field frequency of an NTSC color video signal. Further, a control voltage is applied to bi-morph plates 28A and 28B from a tracking control circuit 50 according to this invention whereby to control the heights of the individual magnetic heads 24A, 24B, 24C and 24D.

Figure 4:
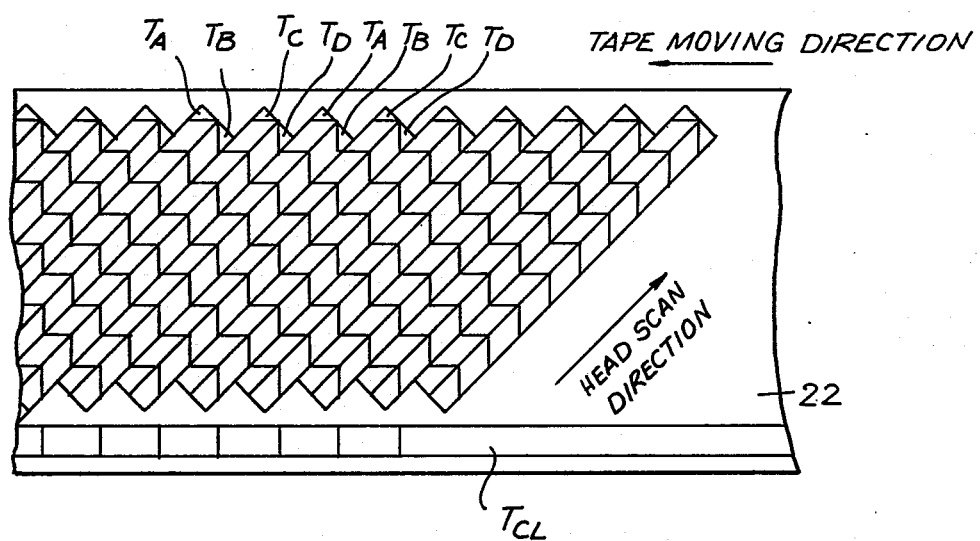
FIG. 4 is a schematic plan view of a portion of magnetic tape having a track pattern recorded thereon with the rotary magnetic head assembly of FIGS. 1–3.

Magnetic tape 22 is wound about the peripheral wall of rotary magnetic head assembly 20 so as to subtend an angle of substantially 360° and is advanced at a predetermined speed in frictional contact with magnetic heads 24A, 24B, 24C and 24D as the latter are rotated. In this manner, four parallel recording tracks $T_A$, $T_B$, $T_C$ and $T_D$ are formed extending obliquely on magnetic tape 22 for each field, in an abutting relation, and with the video signal recorded in adjacent tracks having a different azimuth angle. In addition, a control track $T_{CL}$ is recorded at the lower edge of magnetic tape 22 in the longitudinal direction thereof, as shown in FIG. 4.

In order to facilitate a better understanding of the present invention, there will first be described the condition for digital recording of an NTSC color video signal. In the NTSC system, each frame comprises 525 lines which are divided into two fields such that the first field contains 262 lines and the second field contains 263 lines of data. Since the vertical synchronizing signal and the like are not regarded as effective data, these signals are not recorded in the tracks on the magnetic tape 22. On the other hand, during the vertical retrace interval, the test signals, such as the VIR and VIT signals are recorded in the tracks on magnetic tape 22. Accordingly, for an NTSC color video signal, an effective field is arranged to include 256 field lines of video information. Further, each field line includes one horizontal line of the color video signal excluding the horizontal synchronizing signal HD and the burst signal BS, each horizontal line being sampled and digitized as an effective video region.

Figure 5:
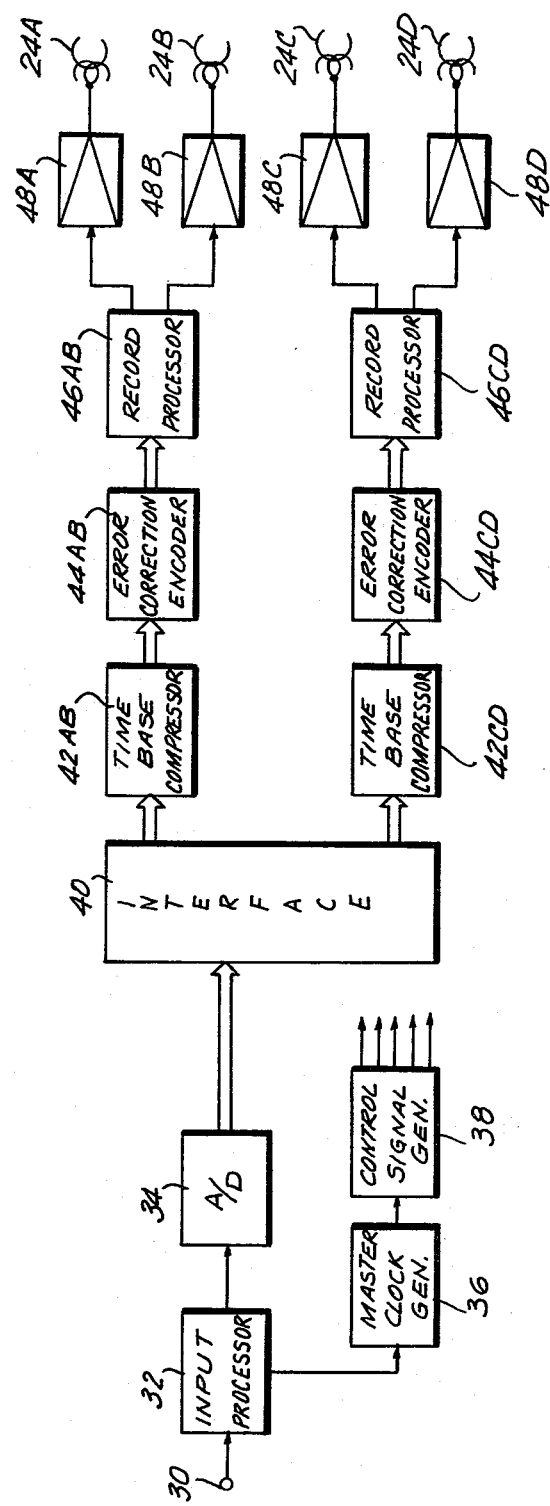
FIG. 5 is a block diagram illustrating a recording section of a digital video tape recorder (VTR) embodying this invention and including the rotary magnetic head assembly of FIGS. 1–3.

Referring in detail to FIG. 5, it will be seen that an NTSC color video signal to be recorded is applied through an input terminal 30 to an input processor 32. The input processor 32 comprises a clamp circuit and a synchronizing and burst signal separator and supplies the effective or video information portion of the color video signal to an A/D converter circuit 34. The synchronizing signal HD and burst signal BS separated from the color video signal by processor 32 are applied to a master clock generator 36 which is desirably of PLL (phase locked loop) construction. The master clock generator 36 generates clock pulses synchronized with the burst signal BS at, for example, four times the color sub-carrier frequency $f_{sc}$, that is, $4f_{sc}$. These clock pulses from generator 36 and the synchronizing signal are applied to a control signal generator 38 which produces various kinds of timing pulses, identifying signals (ID) for identifying lines, fields, frames and tracks, and a control signal, such as, a train of sampling pulses.

The A/D converter circuit 34 generally comprises a sample and hold circuit and an A/D converter for converting each sampled output to an 8-bit code which is supplied, in parallel form, to an interface 40. The number of sampled picture elements in each horizontal period H varies with the sampling frequency $f_s$ employed. Since the color sub-carrier frequency $f_{sc}$ is 455/2 times the horizontal scanning frequency $f_H$, 910 sampled picture elements are contained in one horizontal scanning period for a sampling frequency of $4f_{sc}$. Since the sampling operation is not performed during each horizontal blanking period, the number of effective video samples is selected to be 768 per line or horizontal period, as shown in FIG. 6.

In accordance with the present invention, the digital video signal is distributed into four channels A, B, C and D for recording. As an example, data in one horizontal line is divided into first and second half lines of data, and each of these first and second half lines of data are then divided into four sub-blocks, whereby each horizontal line is divided into eight data sub-blocks $D_1$, $D_2$, ..., $D_8$, each comprised of 96 samples. The first half line of data including sub-blocks $D_1$, $D_2$, $D_3$ and $D_4$ is distributed to channels A, B, C and D, and the second half line of data including sub-blocks $D_5$, $D_6$, $D_7$ and $D_8$ is also distributed to channels A, B, C and D. More particularly, data in sub-blocks $D_1$ and $D_5$ are recorded in the A channel track $T_A$, data in sub-blocks $D_3$ and $D_7$ are recorded in the B channel track $T_B$, data in sub-blocks $D_2$ and $D_6$ are recorded in the C channel track $T_C$, and data in sub-blocks $D_4$ and $D_8$ are recorded in the D channel track $T_D$.

If the four channels of data are each processed independently, four signal processing systems are required, leading to a complicated construction and a high cost. Thus, in accordance with this invention, data is processed on a time division basis through two channels, an AB channel consisting of the A and B channels and a CD channel consisting of the C and D channels. In this regard, the digitized effective video region of the color video signal is distributed by interface 40 into channels AB and CD, whereby the bit rate in interface 40 is reduced to $\frac{1}{2}$ of the bit rate of the signal supplied thereto. In particular, as shown in FIG. 6B, in the AB channel data sub-blocks $D_1$ and $D_3$ are multiplexed, that is, processed on a time division basis such that the samples of data sub-block $D_1$ and the samples of data sub-block $D_3$ occur alternately. In like manner, data sub-blocks $D_5$ and $D_7$ in channel AB are multiplexed on a time division basis such that the samples of data sub-block $D_5$ and the samples of data sub-block $D_7$ occur alternately. In the CD channel, as shown in FIG. 6C, the samples of data sub-block $D_2$ and the samples of data sub-block $D_4$ are processed on a time division basis, and the samples of data sub-block $D_6$ and those of data sub-block $D_8$ are also processed on a time division basis.

The data of the two channels AB and CD are processed in the same manner. The data in channel AB is derived as a record signal for heads 24A and 24B after being applied, in sequence, from interface 40 to a time base compression circuit 42AB, an error correction encoder 44AB, a recording processor 46AB and recording amplifiers 48A and 48B. The data in the other channel CD is also processed by the same arrangement, that is, by a time base compression circuit 42CD, an error correction encoder 44CD, a recording processor 46CD and recording amplifiers 48C and 48D, to provide a record signal for head 24C and 24D. The recording amplifiers 48A, 48B, 48C and 48D are connected by way of a rotary transformer (not shown) to the rotary head 24A, 24B, 24C, and 24D which, as previously discussed, are disposed in close proximity to each other.

The code arrangement of each of the record signals respectively provided at heads 24A, 24B, 24C and 24D will now be described with reference to FIG. 6H. As there shown, a sub-block (one-eight of a horizontal line) of the coded digital signal is comprised of 107 samples (856 bits), in which a block synchronizing signal (SYNC) of three samples (24 bits), an identifying (ID) and address (AD) signal of four samples (32 bits), information data of 96 samples (768 bits) and block parity data (BPC) of four samples (32 bits) are arranged one after another. The block synchronizing signal is used for identifying the beginning of a sub-block, whereupon the identifying and address signals, the information data and/or BPC code can be extracted. The identifying signals ID indicate the channel (track), the frame, the field and the line to which the information data of the sub-block belongs, and the address signal AD represents the address of the respective sub-block in each field of each channel. The BPC code is used for the detection of an error in the information data of the respective sub-block.

Figure 7:
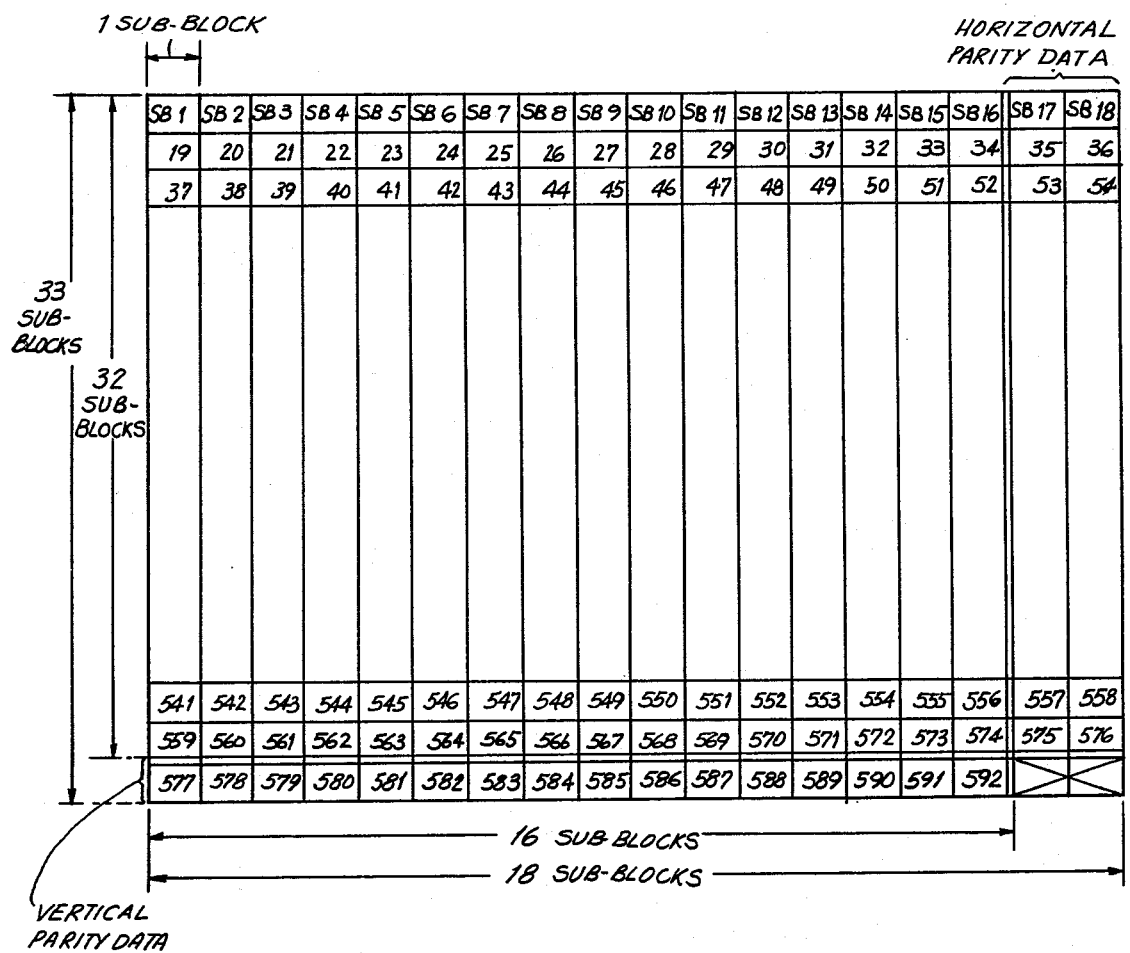

FIG. 7 shows the code arrangement for one field in one channel. In FIG. 7, each reference character SBi (i=1~592) indicates one sub-block with the number (i=1~592) following corresponding to the address signal (AD) aforementioned. Since the effective video region of one field is comprised of 256 lines, as mentioned previously, the data of 512 sub-blocks exist in one field. The video information data of a particular field are sequentially arranged in a 32×16 matrix form. Parity data are also provided in connection with the horizontal and vertical directions, respectively, of the video information data in the matrix. More particularly, on FIG. 7, the parity data for the horizontal direction is shown positioned in the seventeenth and eighteenth columns of sub-blocks, and the parity data for the vertical direction is positioned in the twenty-third row at the bottom. The parity data for the horizontal direction is formed in two ways by 8 sub-blocks respectively taken out of the 16 sub-blocks forming one row of the matrix. In the first row, for example, parity data $SB_{17}$ is formed by the modulo 2 addition:

$$[SB_1]+[SB_3]+[SB_5]+ \ldots +[SB_{15}]=[SB_{17}]$$

In the above, [SBi] means only the data in the respective sub-block SBi. In this case, samples belonging to respective ones of the 8 sub-blocks are each calculated in a parallel, 8-bit form. Similarly, by the modulo 2 addition:

$$[SB_2]+[SB_4]+[SB_6]+ \ldots +[SB_{16}]=[SB_{18}]$$

parity data $[SB_{18}]$ is formed. The parity data is similarly formed for each of the second to thirty-second rows in the horizontal direction. Enhancement of the error correcting ability results from the fact that parity data is not formed merely by the data of the 16 sub-blocks included in a row, but is formed by the data of 8 sub-blocks positioned at intervals of every other sub-block in the row.

The parity data for the vertical direction is formed by the data of 32 sub-blocks in each of the first to sixteen columns of sub-blocks. In the first column, parity data $[SB_{577}]$ is formed by the modulo 2 addition:

$$[SB_1]+[SB_{19}]+[SB_{37}]+ \ldots [SB_{559}]=[SB_{577}]$$

In this case, samples belonging to each one of the 32 sub-blocks are calculated in a parallel 8-bit form.

Accordingly, these parity data comprise 96 samples as is also the case with the video data of each sub-block. In the case of transmitting the digital signal of one field of the above matrix arrangement (33×18) as a series of first, second, third, . . . thirty-third rows in sequence, 18 sub-blocks are made to correspond to a length of 8H, whereby a period of 8×33=264H is needed for transmitting the digital signal of one field.

Incidentally, if the VTR is of the C-format type, and thus employs an auxiliary head for recording and reproducing one part of the vertical blanking period in one field, then a duration of only about 250H can be recorded with a video head. In accordance with the present invention, a duration of 264H, leaving a margin of several H's, has to be recorded in each track, that is, the period of 264H of data to be transmitted is time-base-compressed (with a compression ratio Rt of 41/44) to a period of duration of 246H. Further, a pre-amble signal and a post-amble signal, each having the transmitting bit frequency, are inserted at the beginning and the terminating end of the record signal of one field having the period of 264H.

The time base compression circuits 42AB and 42CD in FIG. 5 compress the video data with the above-noted compression ratio 41/44 and provide a data blanking period in which the block synchronizing signal, the identifying and address signals and the BPC code are inserted for each sub-block of video data of 96 samples, and at the same time, set up data blanking periods in which the blocks of the parity data are inserted. The parity data for the horizontal and vertical directions and the BPC code of each sub-block are generated by the error correction encoders 44AB and 44CD. The address signal AD represents the previously noted number (i) of the sub-block. Further, in the recording processors 46AB and 46CD there are provided an encoder of the block coding type which converts the number of bits of one sample from 8 to 10, and a parallel-to-serial converter for serializing the parallel 10-bit code. As disclosed in detail in U.S. patent application Ser. No. 06/171,481, filed July 23, 1980 and having a common assignee herewith, the block coding is such that $2^8$ codes whose DC levels are close to zero are selected from $2^{10}$ codes of 10-bit and arranged to have one-to-one correspondence to the original 8-bit codes. By means of the foregoing, the DC level of the record signal is made as close to zero as possible, that is, "0" and "1" alternate with each other as much as possible. Such block coding is employed for preventing degradation of the transmitting waveform on the playback side by substantial DC free transmission. It is also possible to achieve the same results by employing a scramble system utilizing the so-called M-sequence which is substantially random in place of the block coding. In error correction encoders 44AB and 44CD and in recording processors 46AB and 46CD, the multiplexed data is processed on a time division basis with respect to each sample, whereby the data rate is reduced still further by one-half, that is, one-quarter with respect to the original sampled data.

The serial digital signals are thereafter obtained for each channel from recording processors 46AB and 46CD and coupled through recording amplifiers 48A, 48B, 48C and 48D to the respective magnetic heads 24A, 24B, 24C and 24D. As previously discussed in connection with FIG. 4, the video signal for one field is then recorded in four oblique tracks $T_A$, $T_B$, $T_C$ and $T_D$, with the A channel signal being recorded with the first magnetic head 24A, the B channel signal with the second magnetic head 24B, the C channel signal with the third magnetic head 24C and the D channel signal with the fourth magnetic head 24D. With this apparatus, the track width and pitch of the heads 24A, 24B, 24C and 24D are selected such that each set of tracks $T_A$, $T_B$, $T_C$ and $T_D$ corresponds to a single SMPTE "C" format video track.

In the reproducing or playback operation of the digital VTR according to this invention, the four channels of reproduced signals are derived from the heads 24A, 24B, 24C and 24D which scan tracks $T_A$, $T_B$, $T_C$ and $T_D$, respectively, corresponding thereto, and are applied through playback amplifiers 50A, 50B, 50C and 50D to respective waveform shaping circuits (not shown). Each of the waveform shaping circuits includes a playback equalizer for increasing the high-frequency component of the reproduced signal and shapes the reproduced signal to a clear pulse signal. Further, each waveform shaping circuit extracts a reproducing bit clock synchronized with the pre-amble signal and supplies the reproducing bit clock to a respective playback processor 52A, 52B, 52C or 52D, together with the data. In each of the playback processors 52A, 52B, 52C or 52D, the serial data is converted to parallel form, the block synchronizing signal is extracted, the data is separated from the block synchronizing signal and from the ID, AD and BPC codes or signals, and further, block decoding or 10-bit to 8-bit conversion is performed. The resulting data is applied to a respective time base corrector 54A, 54B, 54C or 54D in which any time base error is removed from the data. Each of the time base correctors 54A, 54B, 54C or 54D is provided with, for example, four memories, in which reproduced data are sequentially written by clock pulses synchronized with the reproduced data, and the data are sequentially read out from the memories, by reference clock pulses. When the reading operation is likely to get ahead of the writing operation, the memory from which the data has just been read is read again.

Figure 8:
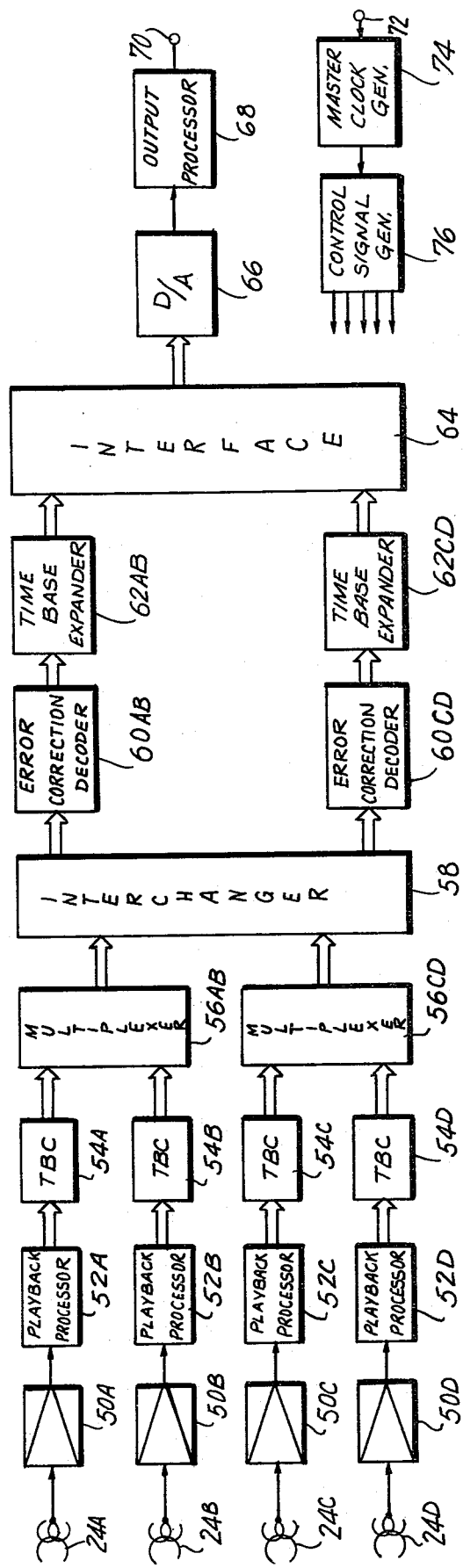
FIG. 8 is a block diagram illustrating a reproducing section of a digital video tape recorder (VTR) embodying this invention.

The signals from time base correctors 54A and 54B are supplied to a multiplexer 56AB, while the signals from time base correctors 54C and 54D are supplied to a multiplexer 56CD. In multiplexer 56AB, the A and B channel digitized signals are alternately processed for each sample on a time division basis to obtain an AB channel sample sequence. In multiplexer 56CD, the C and D channel digitized signals are alternately processed for each sample on a time division basis to obtain a CD channel sample sequence. The sample sequences are rated down by a factor of ½ with respect to the original data supplied thereto. Thus, the samples appear sequentially so that one sample is produced for every 2 clock pulses. The digitized signals from multiplexers 56AB and 56CD are then supplied through an interchanger 58 to error correction decoders 60AB and 60CD, as shown in FIG. 8.

In interchanger 58, a channel discrimination operation is effected, on a time division basis, and in accordance with the identification signal added to each sub-block, whereby the data in each sub-block is correctly distributed to the respective channels. Interchanger 58 is particularly useful in other than the normal reproducing mode, for example, in the fast-forward reproducing mode. For example, in an ordinary playback operation in which the rotary heads faithfully scan the recording tacks on the magnetic tape or in slow motion or still picture playback in which the rotary heads are controlled in position so that they faithfully follow the recording tracks respectively, signals are reproduced only from the tracks $T_A$, $T_B$, $T_C$ and $T_D$ corresponding to the four rotary heads 24A, 24B, 24C and 24D. However, during high speed reproducing, in which the running speed of the magnetic tape is as high as several tens of times its ordinary speed, each of the rotary heads scans a plurality of recording racks. As a result, signals reproduced from the tracks $T_A$, $T_B$, $T_C$ and $T_D$ are mixed together. In such a case, interchanger 58 identifies the correct channels of the reproduced signals, using track identifying signals, and supplies the reproduced signals to the error correction decoder 60AB or 60CD for the respective channel.

Each error correction decoder 60AB or 60CD includes error detecting and correcting circuits using BPC, horizontal and vertical parities and the like. In particular, decoders 60AB and 60CD each include a field memory adapted to store data for one channel in one field. The A and B channel data and the C and D channel data are processed on a time division basis in the respective decoders 60AB and 60CD, whereby data is written into the field memory in accordance with the address AD assigned to each sub-block, and a data error correction operation is effected according to the block parity data (BPC) and horizontal and vertical parity data. More particularly, the error correction operation is effected by first performing an error correction operation in each sub-block in accordance with the sub-block parity data, then in accordance with the horizontal parity data and finally in accordance with the vertical parity data.

The data from each error correction decoder 60AB or 60CD is applied to a respective time base expander circuit 62AB or 62CD, which returns the data to the original transmitting rate and then applies the data to a common interface 64. The interface 64 serves to return the reproduced data of the two channels into a single channel which includes a D/A converter circuit 66 for conversion of the data into analog form. From the interface 64 there may also be provided a digital video output (not shown). Since a digital video input and a digital video output may be provided in the recording and reproducing sections of FIGS. 5 and 8, editing and dubbing can be carried out with digital signals, that is, without conversion from and/or to analog form.

The output from D/A converter circuit 66 is applied to an output processor 68, which reinserts the horizontal synchronizing signal HD and the burst signal BS, and from which a reproduced color video signal is provided at an output terminal 70. An external reference signal may be supplied from a terminal 72 to a master clock generator 74, from which clock pulses and a reference synchronizing signal are provided to a control signal generator 76. The control signal generator provides control signals synchronized with the external reference signal, such as, various timing pulses, identifying signals for the line, field and frame, and sample clock pulses.

Figure 9:
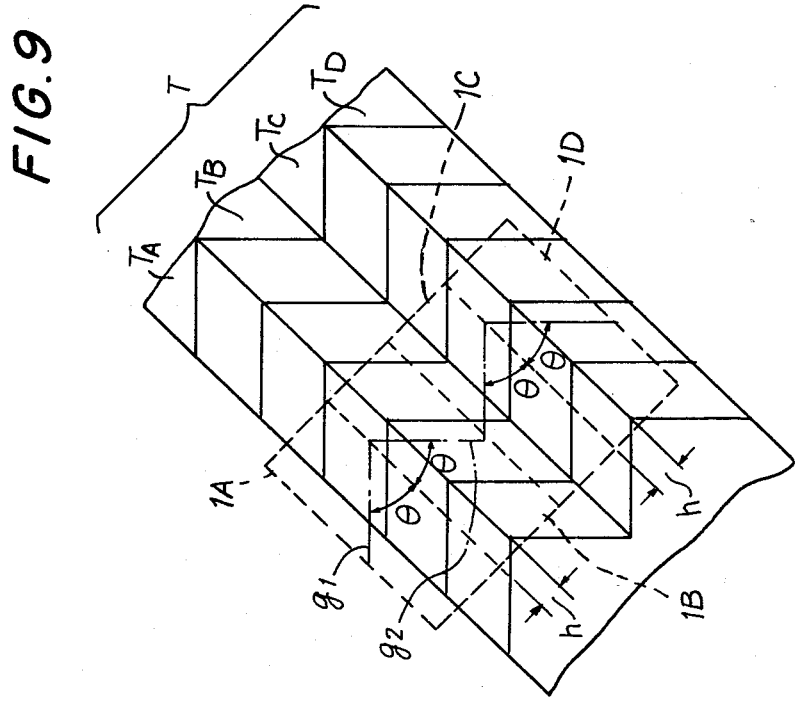
FIG. 9 is a schematic illustration of a portion of four recorded tracks on the magnetic tape of FIG. 4 used for illustrating the tracking error detection operation by the present invention.

With the digital VTR described above, in which four channels of digital signals are simultaneously recorded and simultaneously reproduced by rotary magnetic head assembly 20 comprised of magnetic heads 24A, 24B, 24C and 24D, if a tracking error results when the tracks are traced by magnetic heads 24A, 24B, 24C and 24D during playback, a phase difference is produced between the reproduced digital signals in the four channels. For example, if a tracking error h in the direction normal to the recording tracks T on magnetic tape 22 is produced by magnetic heads 24A, 24B, 24C and 24D, which have an azimuth angle $\theta$ which is opposite for adjacent heads, as shown in FIG. 9, one of the signals reproduced by first and second adjacent magnetic heads 24A and 24B is advanced, while the other is retarded by an amount d as follows:

$$d = h \tan \theta$$

The same holds true for the signals reproduced by adjacent magnetic heads 24C and 24D. In this manner, a phase difference of 2d is produced where $$2d = 2h \tan \theta$$

If the azimuth angle $\theta$ is equal to 7° and the tracking error of $-h = 10$ μm, $$2d = 20 \tan 7° = 2.46 \, \mu m.$$

Thus, with a tracking error of 10 μm, a phase deviation of 2.46 μm results. If the signals are recorded with a rate of 50 Mb/sec. for each track, the intertrack deviation corresponds to about 5 clock pulses, since one wavelength is approximately 1 μm. It is to be noted that one wavelength is approximately equal to 0.5 μm for a 50 MHz clock signal.

In accordance with this invention, the block synchronizing signals SYNC, which are present in the recorded digitized signal for each channel, are utilized to detect the aforementioned phase difference to obtain the tracking error used in a tracking control operation. Thus, with the digital VTR, as previously described, in which the digitized signal is distributed to four channels and recorded in four tracks by magnetic heads 24A, 24B, 24C and 24D, any two adjacent tracks of different azimuth angles among the four channel recording tracks may be selected, and the phase difference between the block synchronizing signals SYNC that are contained in these recording tracks may be used to detect the tracking error for the tracking control operation. In this manner, tracking control of the non-selected channel tracks may also be obtained.

Figure 10:
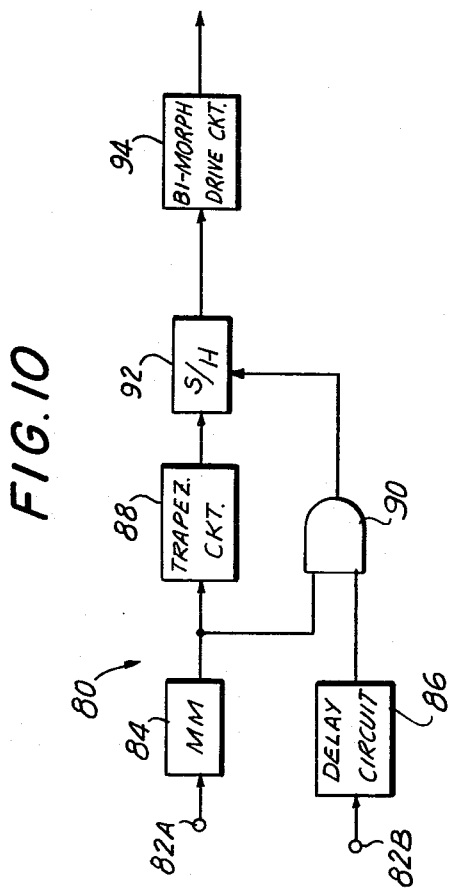
FIG. 10 is a block diagram of a tracking control circuit according to one embodiment of this invention.

Referring now to FIG. 10, a tracking control circuit 80 for effecting such tracking control operation includes input terminals 82A and 82B supplied with the block synchronizing signals SYNC from two reproducing processors, for example, 52A and 52B, respectively, that correspond to adjacent first and second magnetic heads 24A and 24B having different azimuth angles. The block synchronizing signals SYNC 1 (FIG. 11A) and SYNC 2 (FIG. 11B) are supplied from input terminals 82A and 82B to a monostable multivibrator 84 and a delay circuit 86, respectively. Monostable multivibrator 84 is triggered by the leading edge of the block synchronizing signal SYNC 1 from reproducing processor 52A to form a pulse signal (FIG. 11D) of a predetermined duration T. This pulse signal is coupled to a trapezoidal wave forming circuit 88 and also to one input of an AND gate 90. AND gate 90 is gate controlled by the pulse signal from monostable multivibrator 84 to transmit the block synchronizing signal SYNC 2 as delayed (FIG. 11C) by delay circuit 86 to a sample and hold circuit 92. The trapezoidal wave forming circuit 88 forms a trapezoidal signal (FIG. 11F) which rises in synchronism with the leading edge of the pulse signal from monostable multivibrator 84. This trapezoidal signal is then supplied to sample and hold circuit 92 which samples and holds the leading edge ramp voltage of the trapezoidal signal in accordance with the output signal (FIG. 11E) from AND gate 90. The hold voltage $V_h$ (FIG. 11G) from sample and hold circuit 92, which corresponds to the phase difference between block synchronizing signals SYNC1 and SYNC2 is then supplied to a bi-morph drive circuit 94. Since the phase comparison in sample and hold circuit 92 is effected in synchronism with the output signal from AND gate 90, if a drop-out of a block synchronizing signal occurs, sample and hold circuit 92 holds the voltage $V_h$ based upon the immediately preceding phase comparison, as shown by dot-dash line in FIG. 11G. Accordingly, bi-morph drive circuit 94, in response to the hold voltage $V_h$ from the sample and hold circuit 92, controls head support device 28 comprised of the two bi-morph plates 28A and 28B to displace magnetic heads 24A-24D so as to eliminate the tracking error.

As previously discussed, rotary head assembly 20, which includes the four magnetic heads 24A, 24B, 24C and 24D having magnetic head gaps $g_1, g_2, g_3$ and $g_4$, respectively, with adjacent heads have different azimuth angles, may be constructed such that magnetic head gaps $g_1$ and $g_3$ of the first and third magnetic heads 24A and 24C have the same azimuth angle and magnetic head gaps $g_2$ and $g_4$ of the second and fourth magnetic heads 24B and 24D have the same azimuth angle. This construction is advantageous from the manufacturing viewpoint in that adjustment of the magnetic head gaps $g_1, g_2, g_3$ and $g_4$ of the individual magnetic heads 24A, 24B, 24C and 24D, can be easily effected. However, with such construction of magnetic head assembly 20, where the first and third magnetic heads 24A and 24C have the same azimuth angle and the second and fourth magnetic heads 24B and 24D have the same azimuth angle, reroduced output signals can be obtained from magnetic heads 24A and 24B even when the first magnetic head 24A traces the recording track $T_C$ formed by the third magnetic head 24C, and the second magnetic head 24B traces the recording track $T_D$ formed by the fourth magnetic head 24D. In other words, another stable operating position exists for reproduction other than the tracing only of recording tracks $T_A$ and $T_B$ by first and second magnetic heads 24A and 24B. This, of course, is undesirable.

The block synchronizing signals SYNC of the recording signal are recorded in respective tracks $T_A$, $T_B$, $T_C$ and $T_D$ with a definite phase difference therebetween. Therefore, the block synchronizing signals SYNC which are recorded in the individual recording tracks $T_A$, $T_B$, $T_C$ and $T_D$ are in phase only when the first to fourth magnetic heads 24A-24D trace the respective recording tracks $T_A$-$T_D$ during the playback operation. In the case where the first magnetic head 24A traces recording track $T_C$ formed by the third magnetic head 24C having the same azimuth angle as the first magnetic head 24A, the second magnetic head 24B traces recording track $T_D$ formed by the fourth magnetic head 24D having the same azimuth angle as the second magnetic head 24B, the third magnetic head 24C traces recording track $T_A$ formed by the first magnetic head 24A having the same azimuth angle as the third magnetic head 24C, and the fourth magnetic head 24D traces recording track $T_B$ formed by the second magnetic head 24B having the same azimuth angle as the fourth magnetic head 24D, if the feedback loop of tracking control circuit 80 is adjusted so that the phase differences of the block synchronizing signals SYNC of the individual channels during playback conicide with those during recording only when the first magnetic head 24A corresponds to track $T_A$ and the second magnetic head 24B corresponds to track $T_B$, a definite phase shift results between the aforementioned recording and playback states, since the phase differences between the block synchronizing signals SYNC for the four channels are different at the time of recording than at the time of playback. In this case, tracking control circuit 80 thereby appears to be locked in a stable operating condition.

In order for the phases of each block synchronizing signal SYNC, during recording and playback, to conicide, the phase difference between the block sychronizing signal from recording track $T_A$ formed by magnetic head 24A and the block synchronizing signal from recording track $T_B$ formed by second magnetic head 24B should substantially conicide with the phase difference between the block synchronizing signal from recording track $T_C$ formed by third magnetic head 24C and the block synchronizing signal from recording track $T_D$ formed by the fourth magnetic head 24D. In addition, the distance $l_1$ (FIG. 3) between magnetic head gaps $g_1$ and $g_2$ of the first and second magnetic heads 24A and 24B should be made equal to the distance $l_2$ (FIG. 3) between magnetic head gaps $g_3$ and $g_4$ of the third and fourth magnetic heads 24C and 24D during the recording operation.

Although the aforementioned phase difference relation between the block synchronizing signals of the individual recording tracks $T_A$, $T_B$, $T_C$ and $T_D$ can be achieved by suitable electrical circuitry, it is difficult to achieve precise mechanical precision to realize the aforementioned relation of the magnetic head gaps $g_1$, $g_2$, $g_3$, and $g_4$. Therefore, it is desirable that the phases of the block sync signals SYNC for the individual channels coincide during recording and playback such that a stable tracking control operation is obtained only when the first magnetic head 24A traces recording track $T_A$ and second magnetic head 24B traces recording track $T_B$ during playback.

Figure 12:
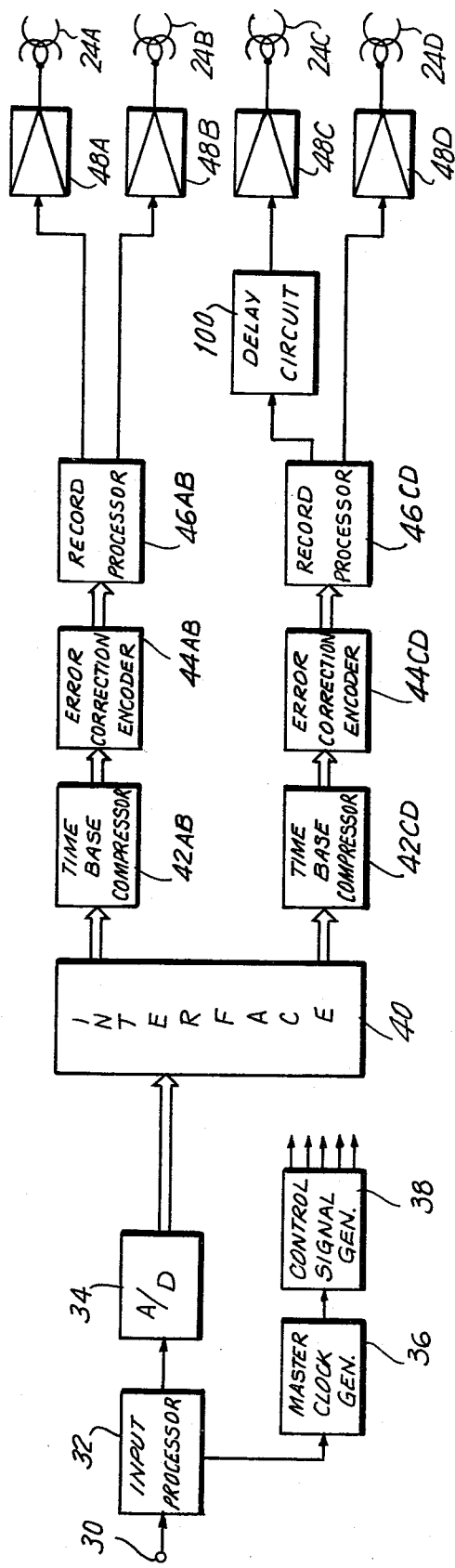
FIG. 12 is a block diagram of a recording section of a digital video tape recorder (VTR) according to one embodiment of this invention.

To attain this objective, and in accordance with the present invention, the phase difference $\theta_1$ between the block synchronizing signals SYNC and SYNC 2 recorded in the first and second recording tracks $T_A$ and $T_B$ by adjacent first and second magnetic heads 24A and 24B and the phase difference $\theta_2$ between the block synchronizing signals SYNC 3 and SYNC 4 recorded in the third and fourth recording tracks $T_C$ and $T_D$ by adjacent third and magnetic heads 24C and 24D are made to differ by approximately 1 to 2 μsec. In other words, if the block synchronizing signals SYNC 1 and SYNC 2 recorded in first and second recording tracks $T_A$ and $T_B$ are in phase, the block synchronizing signals SYNC 3 and SYNC 4 recorded in third and fourth recording tracks $T_C$ and $T_D$ are arranged to have a phase difference of 1 to 2 μsec. In particular, a delay circuit 100 shown in the block diagram of FIG. 12 is provided between recording processor 46CD and recording amplifier 48C for the third magnetic head 24C. In all other respects, the recording system of FIG. 12 is identical to the recording system of FIG. 5, and accordingly, a detailed description of the remaining elements will be omitted for the sake of brevity. In this manner, the serial digital signals, including the block synchronizing signal SYNC, that is supplied from recording processor 46CD through recording amplifier 48C to the third magnetic head 24C, is delayed through delay circuit 100 by approximately 1 to 2 μsec. with respect to the other signals supplied to magnetic heads 24A, 24B and 24D.

With the above construction of the recording system, as shown in FIG. 12, only when recording tracks $T_A$ and $T_B$, which have been formed by first and second magnetic heads 24A and 24B during the recording operation, are reproduced by the same first and second magnetic heads 24A and 24B, is hold voltage $V_h$ provided by sample and hold circuit 92 of the tracking control circuit 80 in accordance with the phase difference between the reproduced block synchronizing signals SYNC 1 and SYNC 2 obtained from magnetic heads 24A and 24B. More particularly, first and second magnetic heads 24A and 24B trace first and second recording tracks $T_A$ and $T_B$ corresponding thereto, and the reproduced block sync signals SYNC 1 and SYNC 2 from magnetic heads 24A and 24B are fed to input terminals 82A and 82B of the aforementioned tracking control circuit 80. The block synchronizing signals SYNC 1 and SYNC 2 are thereafter supplied to monostable multivibrator 84 and delay circuit 86, respectively. Monostable multivibrator 84 is thus triggered by the leading edge of the block synchronizing signal SYNC 1 to produce a pulse signal of a predetermined duration T. This pulse signal is supplied to trapezoidal wave forming circuit 88 and one input of AND gate 90.

AND gate 90 is controlled by the pulse signal from monostable multivibrator 84 to transmit the block synchronizing signal SYNC 2 as delayed (FIG. 11C) by delay circuit 86 to sample and hold circuit 92. The trapezoidal wave forming circuit 88 generates a trapezoidal signal, which rises in synchronism with the leading edge of the pulse signal from monostable multivibrator 84, and is supplied to sample and hold circuit 92. Sample and hold circuit 92 samples and holds the leading edge ramp voltage of the trapezoidal signal in accordance with the output signal from AND gate 90 and, in turn, supplies the hold voltage $V_h$ to bi-morph drive circuit 94 in accordance with the phase difference between block synchronizing signals SYNC 1 and SYNC 2, in the same manner as previously described in regard to the waveform diagrams of FIG. 11.

Figure 13:
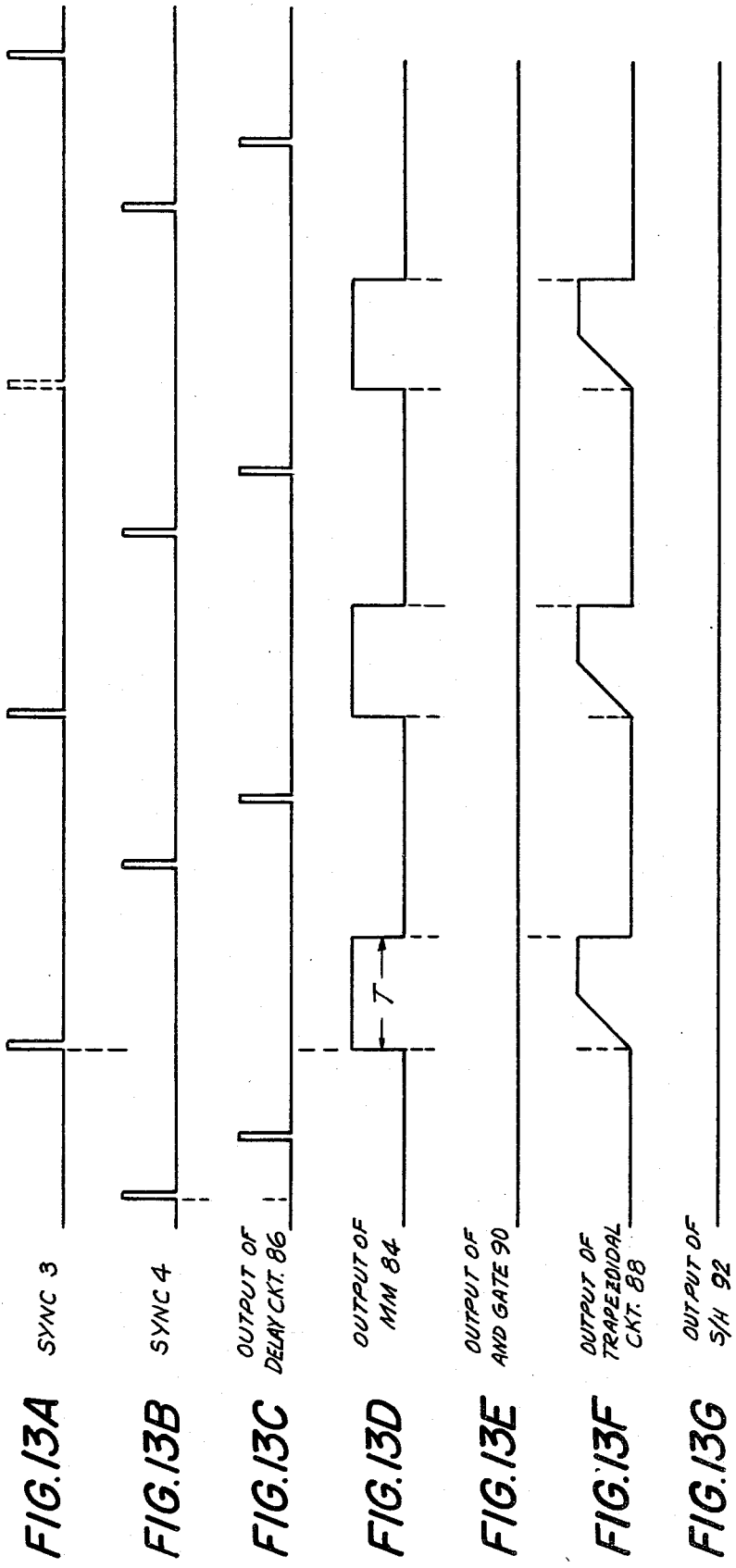
FIGS. 13A through 13G are waveform diagrams used for illustrating the operation of the tracking control circuit of FIG. 10 when used with the recording section of FIG. 12.

However, when first magnetic head 24A traces the third recording track $T_C$ formed by third magnetic head 24C, and second magnetic head 24B traces the fourth recording track $T_D$ formed by the fourth magnetic head 24D, the delayed output signal (FIG. 13C) from delay circuit 86 of tracking control circuit 80 does not occur within the predetermined pulse duration T of the pulse signal (FIG. 13D) from monostable multivibrator 84, as shown in FIG. 13, since the reproduced block synchronizing signal SYNC 3 (FIG. 13A) reproduced by first magnetic head 24A is delayed by 1 to 2 μsec. from the reproduced block synchronizing signal SYNC 4 reproduced by second magnetic head 24B. In this manner, no output signal is obtained from AND gate 90, as shown in FIG. 13E and therefore the leading edge ramp voltage of the trapezoidal signal (FIG. 13F) from trapezoidal wave forming circuit 88 is not sampled and held so that no hold voltage $V_h$ corresponding to the phase difference between the block sync signals SYNC 3 and SYNC 4 can be obtained, as shown in FIG. 13G. Thus, when the first magnetic head 24A traces the third recording track $T_C$ and second magnetic head 24B traces the fourth recording track $T_D$, no stable operating condition exists, even when the magnetic head gaps $g_1$ and $g_2$ of the first and second magnetic heads 24A and 24B are the same as the magnetic head gaps $g_3$ and $g_4$ of the third and fourth magnetic heads 24C and 24D, respectively. In other words, stable operation is obtained for tracking control circuit 80 only when first and second magnetic heads 24A and 24B trace the respective first and second recording tracks $T_A$ and $T_B$. It is to be appreciated that, although in the above embodiment, the four magnetic heads have been secured to the ends of bi-morph plate 28A and 28B and are thereby adapted to be biased in a direction normal to the scanning direction of the tracks for the tracking control operation in accordance with the present invention, as above-described, even with a digital VTR which does not use such bi-morph plates, the phase signals above-mentioned may be used to control the capstan motor which advances the magnetic tape in a capstan servo-control operation.

Figure 14:
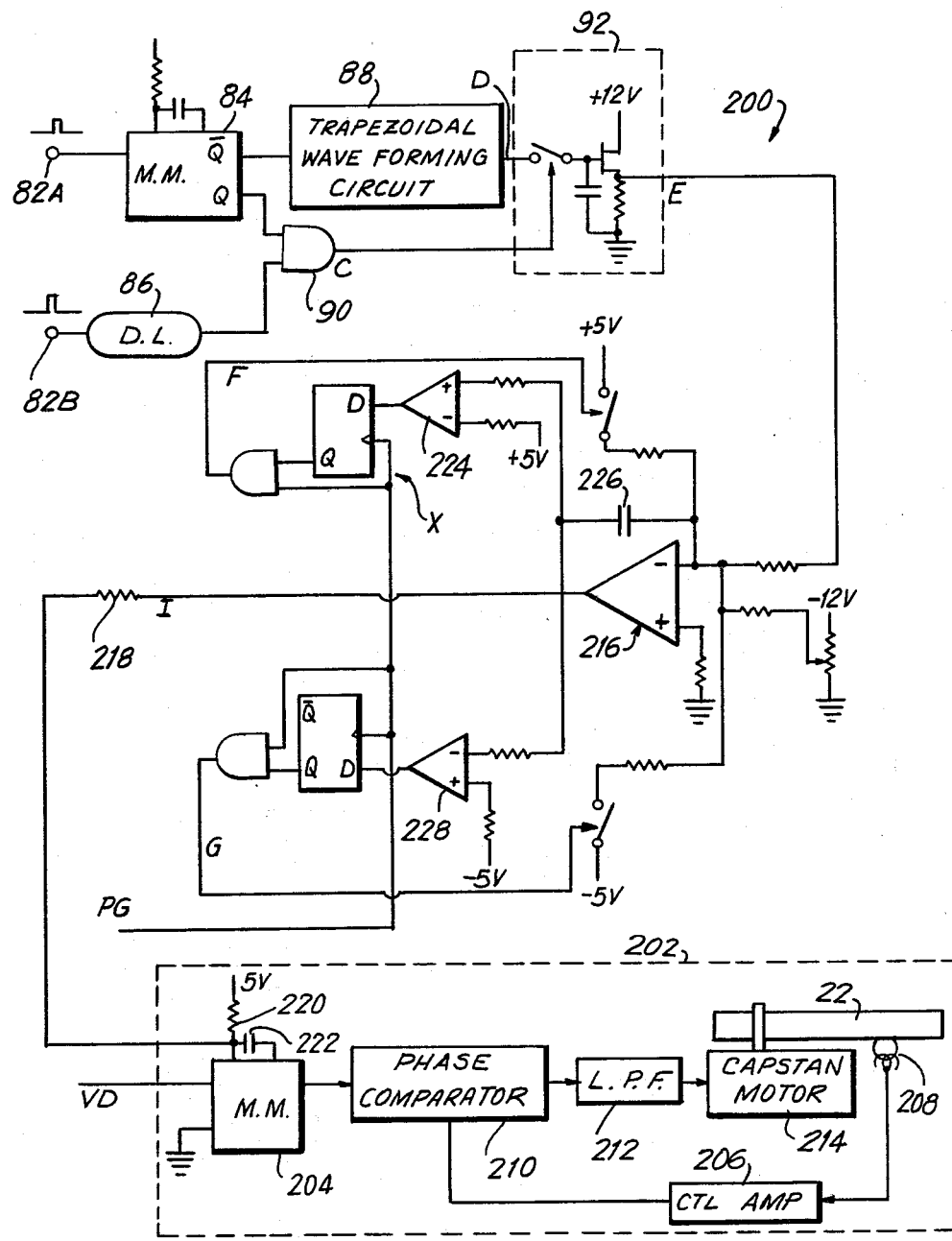
FIG. 14 is a block, circuit-wiring diagram of another tracking control circuit that can be used with the present invention.
Figure 16:
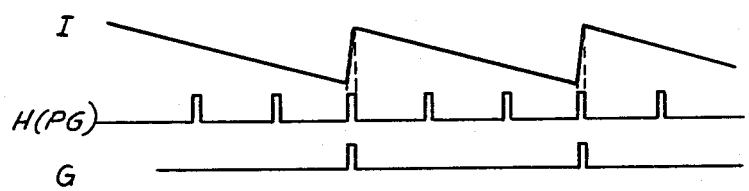

Referring now to FIG. 14, a tracking control circuit 200 according to another embodiment of this invention will now be described, with elements corresponding to those described above with reference to the tracking control circuit 80 being identified by the same reference numerals. In particular, tracking control circuit 200 includes a conventional capstan servo circuit 202 comprises of a monostable multivibrator 204 to which the vertical synchronizing signal VD obtained from the reproduced video signal is supplied, a CTL amplifier 206 for amplifying the reproduced control signal $T_{CL}$ from a CTL head 208, and a phase comparator 210 for comparing the phase of the output from CTL amplifier 206 and the phase of the output from multivibrator 204. The output of phase comparator 210 is supplied through a low-pass filter 212 to a capstan motor 214 for controlling the rotation thereof. The phase comparator 210, although not shown in detail, has the same construction as the combination of the aforementioned trapezoidal wave forming circuit 88 and sample-hold circuit 92 in FIG. 14.

As with tracking control circuit 80 of FIG. 10, the block synchronizing signals SYNC 1 and SYNC 2 are supplied through input terminals 82A and 82B, respectively, to monostable multivibrator 84 and delay circuit 86, respectively. The output of multivibrator 84 is supplied to trapezoidal wave forming circuit 88 which, in turn, supplies a trapezoidal signal D to sample and hold circuit 92. The output of multivibrator 84 is also supplied to one input of AND gate 90 to gate the output from delay circuit 86 therethrough as an output signal C to sample and hold circuit 92. The latter circuit thereby samples the trapezoidal signal D with the output signal C to produce a sample and hold signal E supplied to the inverting input of an operational amplifier which functions as an integrating circuit 216.

The control voltage I generated at the output of integrating circuit 216 is supplied through a resistor 218 to the connection point between a resistor 220 and a capacitor 222 which determine the time constant of monostable multivibrator 204. Thus, capstan control circuit 202 controls the position of magnetic tape 22 by adding a signal corresponding to the average tracking error between the two magnetic heads to the signal corresponding to the phase difference between the $T_{CL}$ signal and the reproduced vertical synchronizing signal VD. In this regard, a steady tracking control operation is obtained even in cases where errors cannot be followed with an ordinary capstan-servo system. Further, where the video signals are recorded as digital signals, the above arrangement, which effects an average control operation, results in a low signal-to-noise ratio.

With the tracking control circuit of FIG. 14, if a tracking deviation occurs when the tape is advanced at a slow or fast speed so that the block syncronizing signals SYNC can not be reproduced, the output of integrating circuit 216 is held at a plus or minus maximum value. In such case, correct tracking can not be effected, even after the normal tape speed is subsequently resumed. Accordingly, tracking control circuit 200 includes X and Y circuits. In particular, a capacitor 226 is connected between the inverting input of the operational amplifier of integration circuit 216, and to the non-inverting input of an operational amplifier 224 of the X circuit and the inverting input of an operational amplifier 228 of the Y circuit. When the integration output I has a positive slope, amplifier 224 of the X circuit detects a voltage greater than +5 V, as shown in FIG. 15, for discharging capacitor 226 in synchronism with the pulse output of a pulse generator used for detecting the rotation of the rotary magnetic head assembly. On the other hand, when the integration output I has a negative slope, operational amplifier 228 of the Y circuit detects a voltage less than −5 V for discharging capacitor 226 in synchronism with the pulse generator output pulse. With this arrangement, the output of integration circuit 216 will not assume any extreme value, so that the tracking control operation can readily be effected when it again becomes possible to reproduce the block synchronizing signals SYNC.

With tracking control circuit 200, when the block synchronizing signals SYNC are not reproduced, the slope of the output of integration circuit 216 is determined by the output of sample and hold circuit 92. However, in such case, the time in which the tracking operation locks into its stable condition after normal tape speed is resumed is likely to be extended. To prevent such extension of time, a selection switch 230 is connected between sample and hold circuit 92 and integration circuit 216, and the switching state thereof is controlled by a monostable multivibrator 232, as shown in FIG. 17. The block synchronizing signal SYNC 1 or SYNC 2, or the delayed output signal (FIG. 11C), is supplied to monostable multivibrator 232. When the block synchronizing signals are reproduced, the Q output of monostable multivibrator 232 rises to control selection switch 230 to supply the output of sample and hold circuit 92 to integration circuit 216. When the block synchronizing signals are not reproduced, a constant voltage is supplied through selection switch 230 to integration circuit 216. In this manner, a constant slope is always achieved. Accordingly, when the constant speed of the tape is resumed the servo-control system can be immediately applied. By selecting a sufficiently high time constant for monostable multivibrator 216, that is, corresponding to several block synchronizing signals, selection switch 216 can be held without being switched to the constant voltage input, even if a guard band is partially scanned by the rotary magnetic head assembly. It is to be noted that, although either the block synchronizing signals SYNC 1 or SYNC 2, of the delayed output, can be supplied to monostable multivibrator 216, it is advantageous to select the delayed output (FIG. 11C) since it always corresponds to the sample and hold signal produced.

According to the above description of the present invention, two adjacent recording tracks, among at least four channel recording tracks, are formed with different azimuth angles, and a delayed signal with respect to the signal recorded in one of the two adjacent recording tracks is recorded, thereby permitting correct and stable tracking control in accordance with the phase difference between the signals reproduced from the two adjacent recording tracks. Thus, even in the case where a recording signal, such as a video signal, is recorded in a plurality of channels, that is, at least four channels, simultaneous recording on a magnetic recording medium, such as a magnetic tape, can be affected by performing a tracking control operation in accordance with the phase difference between the reproduced signals obtained from the aforementioned two adjacent recording tracks, whereby the remaining two magnetic heads are also controlled to correctly trace the corresponding recording tracks.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for simultaneously recording information signals in at least four successive, parallel channel tracks on a record medium, comprising:

processing means for processing said information signals and for distributing said information signals into at least four channels;

at least four transducer means corresponding to said at least four channels for recording said information signals from said at least four channels in said at least four channel tracks on said record medium, with first and second adjacent ones of said at least four channel tracks having the information signals recorded therein with different azimuth angles; and delay means for delaying the information signals recorded in one of said first and second channel tracks relative to the information signals recorded in the other of said first and second channel tracks.

2. Apparatus for simultaneously recording information signals in four successive, parallel channel tracks on a record medium, comprising:

processing means for processing said information signals and for distributing said information signals into four channels;

four transducer means corresponding to said four channels for recording said information signals from said four channels in said four channel tracks on said record medium, with first and second ones of said four channel tracks being adjacent to each other and having the information signals recorded therein with different azimuth angles; and delay means for delaying the information signals recorded in one of said first and second channel tracks relative to the information signals recorded in the other of said first and second channel tracks.

3. Apparatus according to claim 2; in which the remaining third and fourth ones of said four channel tracks are adjacent to each other and have the information signals recorded therein with different azimuth angles.

4. Apparatus according to claim 3; in which said first, second, third and fourth channel tracks are successively arranged on said record medium, and the information signals are recorded in said first and third channel tracks with a first azimuth angle and the information signals are recorded in said second and fourth channel tracks with a second, different azimuth angle.

5. Apparatus for simultaneously reproducing information signals that have simultaneously been recorded in four successive, parallel channel tracks on a record medium, with a first pair of first and second ones of said four channel tracks being adjacent to each other and having the information signals recorded therein with different azimuth angles and with the information signals recorded in one of said first and second channel tracks being delayed relative to the information signals recorded in the other of said first and second channel tracks, and with a second pair of the remaining third and fourth ones of said four channel tracks being adjacent to each other and having the information signals recorded therein with different azimuth angles; said apparatus comprising:

four transducer means movable in a direction along the four channel tracks for reproducing the signals recorded therein; and tracking control means for controlling the relative positions of said four transducer means and said record medium so that said four transducer means accurately scan respective ones of said four channel tracks in response to one of the phase difference between the signals recorded in said first pair of channel tracks and the phase difference between the signals recorded in said second pair of channel tracks.

6. Apparatus according to claim 5; further including transducer deflecting means responsive to said tracking control means for deflecting said four transducer means to accurately scan said respective ones of said four channel tracks.

7. Apparatus according to claim 5; further including servo-control means for controlling movement of said record medium in response to said tracking control means.

8. Apparatus according to claim 5; in which said informtion signals recorded in each of said channel tracks includes synchronizing signals, and said tracking control means controls the relative positions of said four transducer means and said record medium so that said four transducer means accurately scan said respective ones of said four channel tracks in response to one of the phase difference between the syncronizing signals recorded in said first pair of channel tracks and the phase difference between the synchronizing signals recorded in said second pair of channel tracks.

9. Apparatus according to claim 8; in which said tracking control means includes multivibrator means supplied with the synchronizing signals from a channel track of one of said pairs and producing an output in response thereto; delay means supplied with the synchronizing signals from the other channel track of said one of said pairs and producing an output in response thereto; trapezoidal means for producing a trapezoidal signal in response to the output from said multivibrator means; gating means for gating the output of said delay means with the output of said multivibrator means to produce a gating signal; and sample and hold means for sampling said trapezoidal signal with said gating signal to produce a tracking control signal for controlling the relative positions of said four transducer means and said record medium so that said four transducer means accurately scan respective one of said four channel tracks.

10. Apparatus according to claim 5; in which said first, second, third and fourth channel tracks are successively arranged on said record medium, and the information signals are recorded in said first and third channel tracks with a first azimuth angle and the information signals are recorded in said second and fourth channel tracks with a second, different azimuth angle.

* * * * *